E. B. HACK

MACHINE FOR BREAKING CONCRETE AND OTHER CONGLOMERATE AND
MINERAL BEDS AND DEPOSITS

Filed Aug. 16, 1920

Inventor:
Ernest Barton Hack
By his Attys.
Louis Prevost Whitaker

May 27, 1924.

E. B. HACK 1,495,735

MACHINE FOR BREAKING CONCRETE AND OTHER CONGLOMERATE AND
MINERAL BEDS AND DEPOSITS

Filed Aug. 16, 1920     8 Sheets-Sheet 7

E. B. HACK

MACHINE FOR BREAKING CONCRETE AND OTHER CONGLOMERATE AND MINERAL BEDS AND DEPOSITS

Filed Aug. 16, 1920

Inventor:
Ernest Barton Hack
By his Atty
Louis Russell Whitaker

Patented May 27, 1924.

1,495,735

UNITED STATES PATENT OFFICE.

ERNEST BARTON HACK, OF WESTMINSTER, LONDON, ENGLAND, ASSIGNOR OF ONE-HALF TO GEORGE MOWLEM BURT, OF WESTMINSTER, LONDON, ENGLAND.

MACHINE FOR BREAKING CONCRETE AND OTHER CONGLOMERATE AND MINERAL BEDS AND DEPOSITS.

Application filed August 16, 1920. Serial No. 403,840.

*To all whom it may concern:*

Be it known that I, ERNEST BARTON HACK, a subject of the King of Great Britain, residing at Grosvenor Wharf, Westminster, London, England, have invented a new and useful Machine for Breaking Concrete and Other Conglomerate and Mineral Beds and Deposits, of which the following is a specification.

This invention relates to a machine primarily designed for breaking concrete beds, although it is also applicable for the breaking of other conglomerate and mineral beds and deposits.

According to the invention the machine comprises a series of two or more chisel or other tools each of which is mounted upon a stem designed to be lifted and dropped or otherwise reciprocated so as to cut into and break away or crush the concrete or other bed or deposit, means being provided whereby the depth of the cut of the chisels or the blow of the crushing tool can be varied as required in particular circumstances. The chisels or other tools and their operating gear are mounted upon a travelling carriage which is caused to move as the bed or deposit is cut or broken away so as constantly to expose a fresh surface to the tools.

To enable the invention to be fully understood, I will describe it by reference to the accompanying drawings, in which:—

Figures 5 to 15 are drawn to a larger scale than the remaining figures of the drawings.

Figure 13:
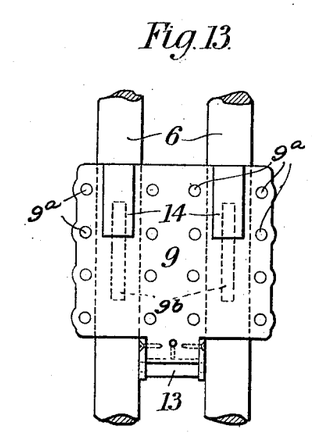
Figures 13, 14 and 15 are, respectively, a front view, a sectional side view, and a horizontal section of the tappets by means of which stems are lifted.
Figure 14:
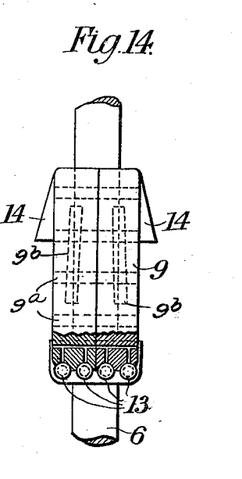
Figure 15:
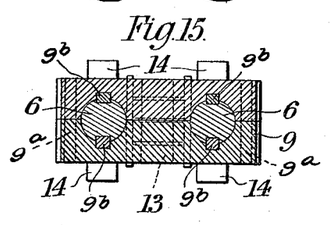

The machine illustrated in the drawings comprises the frame 1 which is preferably a channel or other structural steel frame mounted upon the front and rear travelling wheels 2 and 3, the said frame 1 carrying the superstructure 4. 5 indicates the series of chisel or other cutting, breaking or crushing tools which are preferably arranged in pairs, as clearly shewn, in such a manner that they are operated two at a time. These tools are secured to the lower ends of stems 6 which are carried in guides 7 and 8 in the frame 1 and superstructure 4 respectively. 9 indicates the tappet with which each pair of stems is furnished, and one of which is shewn in detail in Figures 13, 14 and 15. These tappets are rigidly secured upon the pairs of stems 6 and are designed to be engaged by cams 10 which are mounted upon the cross shaft 11 supported in bearings 12 on the superstructure 4 and rotated as hereinafter described. The cams, in the construction illustrated, are so arranged that the pairs of chisels or other tools 5 can be lifted alternately, that is to say, for example, in a row of four pairs, the first pair, then the third, then the second, then the fourth and so on thus distributing the blows or cuts in such a manner as to better effect the disintegration of the concrete or other bed or deposit. The tappets 9 may be provided on the under surfaces against which the cams contact with a series of rollers 13, balls or the equivalent, to reduce friction, and the tappets are preferably as shewn, made in halves so that they can be reversed on the stems 6 for the purpose of changing the surface of the rollers 13 subject to the impact of the cams. The halves of the tappets 9 are herein shown as united by bolts or screws 9$^a$ and in order to firmly unite the tappets to the stems 6, I prefer to employ keys 9$^b$, as best shown in Figs. 13, 14 and 15, which engage grooves or recesses in the opposite faces of the stems 6 and the opposed portions of each half of the tappet, so as to prevent the stems, which are preferably circular in cross section, from rotating with respect to the tappets, and as the tappets are each secured to two of the stems 6, this construction prevents the stems from rotating in their guiding bearings and holds the tools from rotating.

Figure 3:
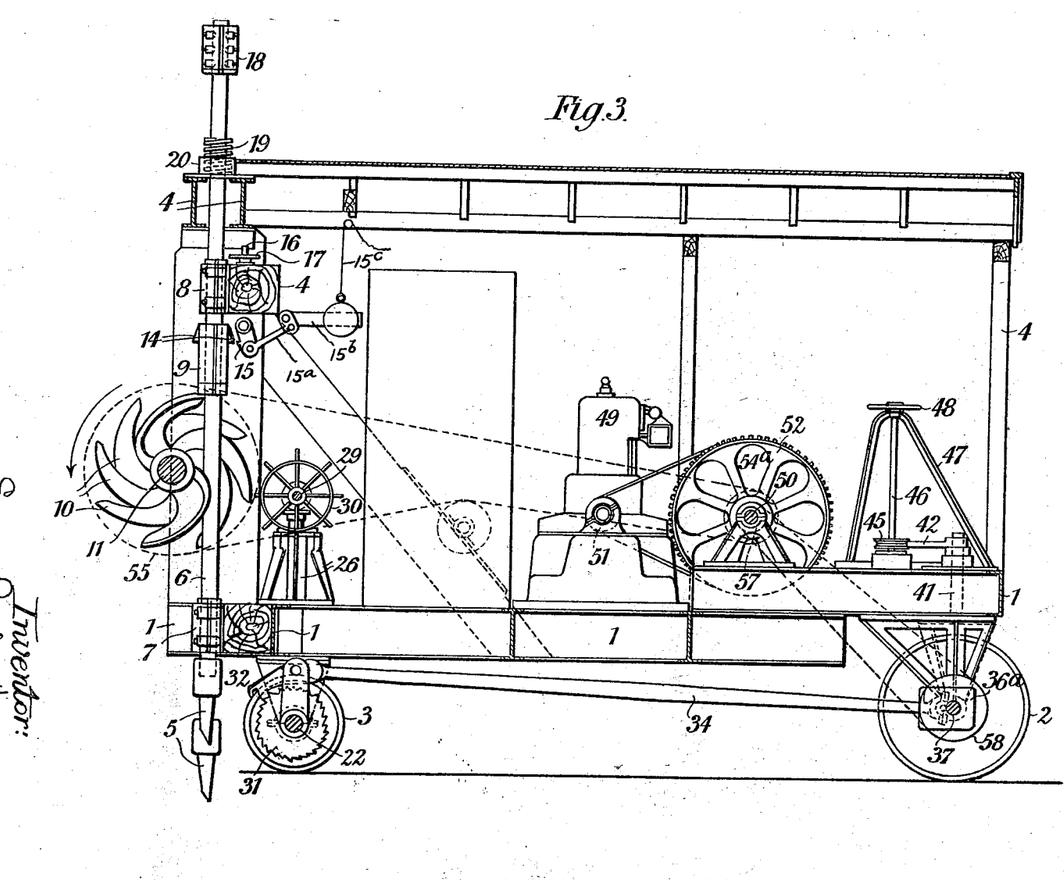
Figure 3 is a side view of the machine.

Means are also provided by which any pair of chisels or other tools can be held out of action when desired. In the embodiment of my invention herein shown each tappet 9 is provided with lugs or shoulders 14 on both its front and rear faces. In rear of each tappet is a hook 15, pivotally suspended at the lower end of a vertically movable bolt or rod 16 passing through a vertical hole in the superstructure 4 and having screw threaded portions engaged by a rotatable nut 17 which may be provided with a hand wheel as shown in Fig. 3. Each hook is connected by a link 15$^a$ with a weighted lever 15$^b$ pivoted to the superstructure 4, so that when released the weighted lever will throw its connected hook 15 forward into position to engage the lugs 14 on the rear face of the adjacent tappet. The hooks 15 are held out of such position, in this instance by means of a cord 15$^c$ or other flexible connection connected to the weight carried by lever 15$^b$, and secured in any desired manner. The hooks 15 are also normally maintained by the vertically movable rods 16 in lowered position so as to be capable of engaging the lugs 14 (when the tappets are in raised position) on releasing the weighted lever 15$^b$ connected therewith. When it is desired to stop the operation of any tappet without stopping the entire machine, the weighted lever 15$^b$ adjacent thereto is released so as to permit it to swing the connected hook 15 forward into position to engage the shoulders or lugs 14 on the adjacent tappet the next time the tappet is elevated by its cam 10. When the tappet is elevated by its cam 10 the shoulders 14 on the rear face of the tappet will move the hook 15 rearwardly and pass above the hook, so that the hook will be pressed forward by the weighted lever and catch under the shoulders 14 and prevent the descent of the tappet and connected tools. The nut 17 on the rod 16 connected with the hook 15 will now be rotated in a direction to raise the rod 16 and hook 15 vertically, thereby raising the tappet sufficiently so that it will not be struck by its cam 10 until again released from the hook 15.

As the tappets are provided with lugs 14 on both their front and rear faces, that is to say on each half of each tappet, the tappets may be reversed if desired without interfering with the above described operation.

18 indicates cushion tappets which are rigidly secured to the projecting upper ends of the stems 6, and 19 are cushion springs which are mounted upon the superstructure 4, the elasticity of each spring being equal to a small compression from the impact flow of the cushion tappet 18. These springs 19 are held in position by means of the thimbles 20.

Figure 5:
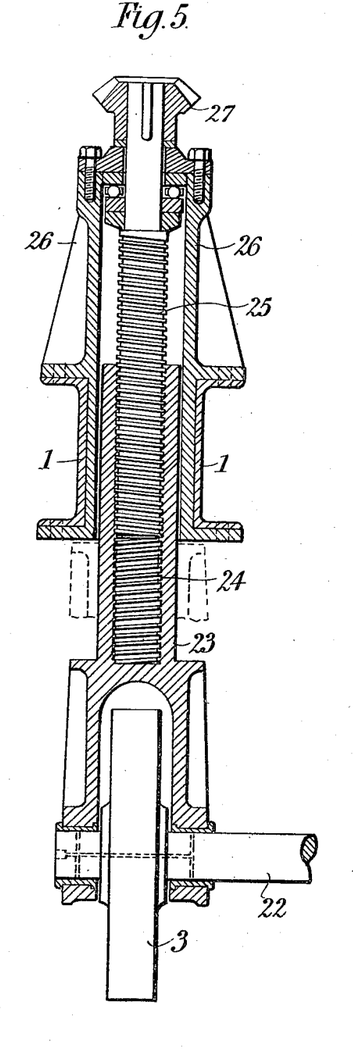
Figure 5 is a vertical section.
Figure 6:
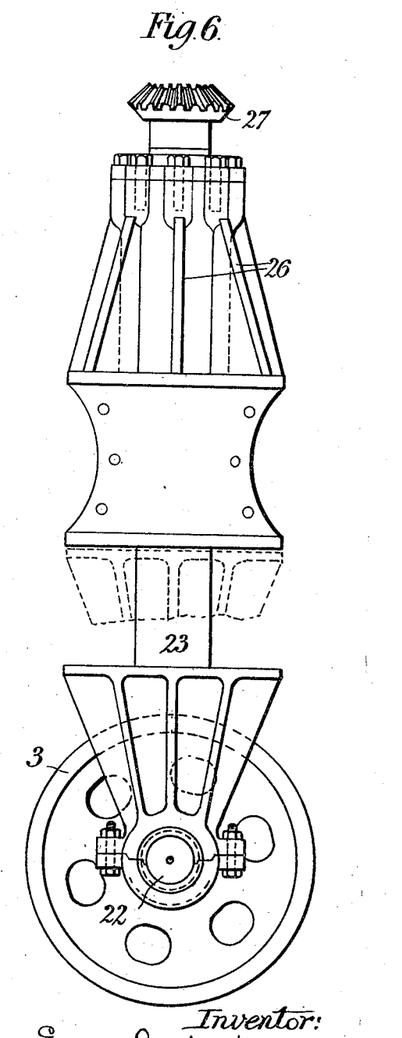
Figure 6 is a side elevation of the mechanism for raising the end of the machine frame.

The frame carrying the chisels or other tools 5, in the construction of machine illustrated, is mounted so that it can tilt upon the axles of the travelling wheels 2 most remote from the tools 5. This is effected by means of the following arrangement, that is to say, the axle 22 of the rear travelling wheels 3 has mounted thereon at each side a pedestal 23, see Figures 5 and 6, the upper part of which pedestal is furnished with an internal screw-thread 24 with which engages a threaded rod 25, the uper end of the said rod being supported in bearings in a bracket 26 and having keyed upon its upper end a bevel pinion 27. Each pinion 27 gears with a bevel pinion 28. The two bevel pinions 28 are keyed upon a horizontal spindle 29 mounted in suitable bearings on the superstructure and having a hand wheel 30 by means of which the said spindle 29 can be turned so as to rotate the threaded rods 25 and so raise or lower the brackets 26 and consequently the rear end of the frame 1 which is turned about the front wheel axle 21 as a pivot or centre.

By thus raising and lowering the machine frame 1 at the rear or tool carrying end, the direction of the said tools can be varied so that the latter can be given a slanting or inclined direction as may be necessary in certain cases.

Figure 7:
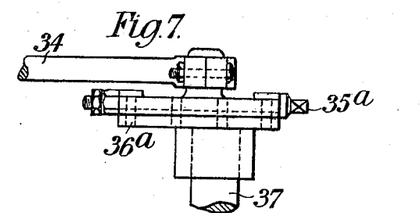
Figure 7 is a plan view of the eccentric mechanism for driving the ratchet and pawl gear for advancing the machine.
Figure 8:
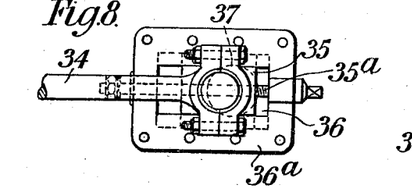
Figure 8 is a view at right angles to Figure 7.
Figure 9:
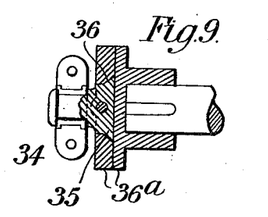
Figure 9 is a transverse section.
Figure 10:
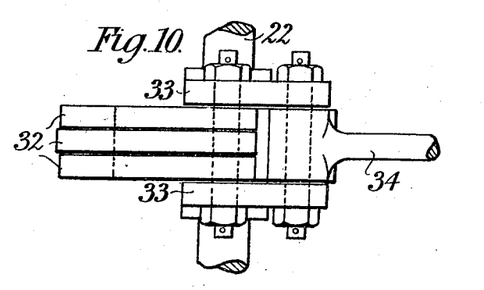
Figure 10 is a plan view illustrating the ratchet and pawl driving mechanism.
Figure 11:
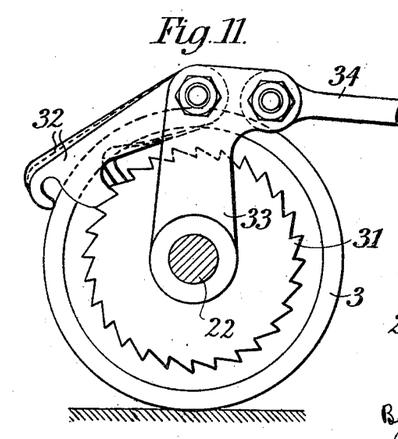
Figure 11 is a side view thereof.
Figure 12:
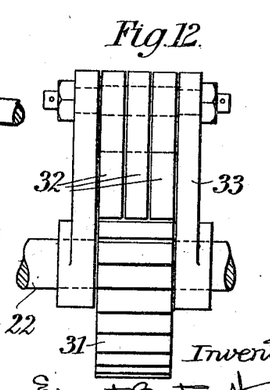
Figure 12 is a view at right angles to Figure 11.

The axle 22 of the rear travelling wheels 3 has keyed upon it a pair of ratchet wheels 31 with each of which engages a set of pawls 32, see particularly Figures 10, 11 and 12. In the drawing sets of three pawls of different lengths are made use of. Each set of pawls is carried by a pair of lever arms 33 pivoted upon the axle 22 and connected to one end of a connecting-rod 34 the other end of which is pivoted to a slide block 35 see Figures 7, 8 and 9, designed to be adjusted in position in a slot 36 in an eccentric 36$^a$ keyed upon a transverse shaft 37 carried in bearings 38 at the front of the machine beneath the main frame thereof. By adjusting the position of the sliding block 35 in the slot 36 through the medium of the screw 35$^a$, the eccentricity of the block 35 to the shaft 37 can be adjusted so that the device constitutes a variable throw eccentric by means of which an intermittent rotation of variable extent can be transmitted to the ratchet wheels 31 on the rear axle 22 so as to cause the machine to travel intermittently to the extent desired.

The front travelling wheels 2 are carried upon short axles 39 which are mounted in bearings in bifurcated brackets 40, having stems 41 which pass up through bearings in the frame 1, and have their projecting upper ends provided with arms 42. The two arms 42 are connected together by means of a rigid rod 43 so that they move in unison, and each of the said arms has also connected to it one end of a cord, chain or the like 44 which is coiled around a pulley 45.

This pulley is keyed upon the lower end of a spindle 46 supported at its upper end in a bearing in a frame 47 secured to the front part of the main frame 1 and having secured upon its upper end a hand-wheel 48. By turning the said hand-wheel the pulley 45 is correspondingly turned so as to move the arms 42 in either direction through the chain or rope 44, thereby turning the front wheels 2 to steer the machine.

Figure 1:
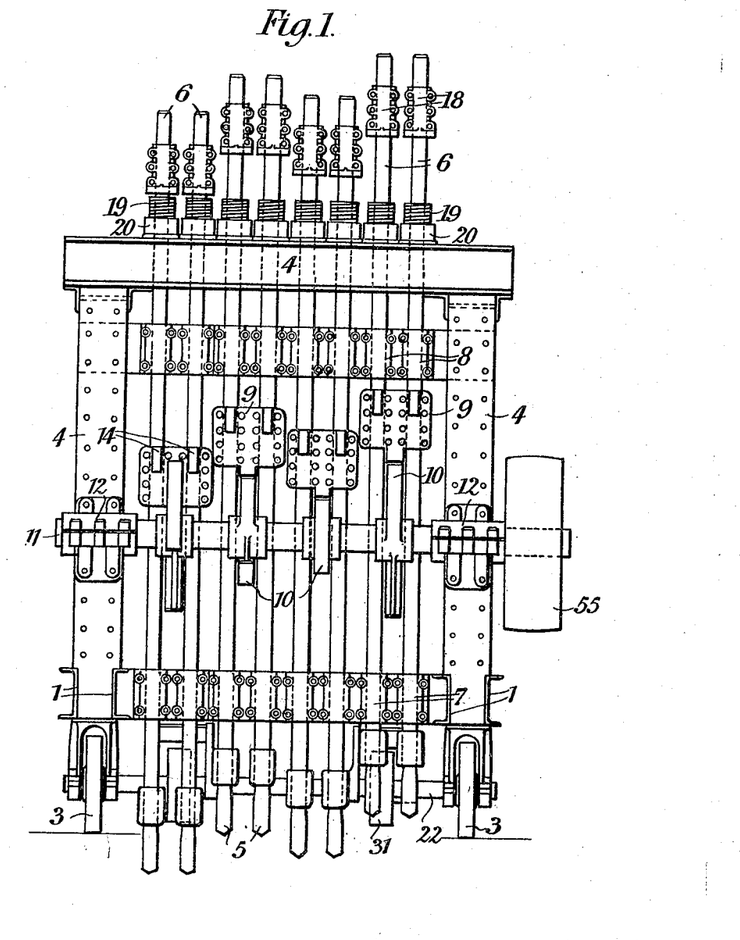
Figure 1 is a rear view of a machine constructed according to the invention.
Figure 2:
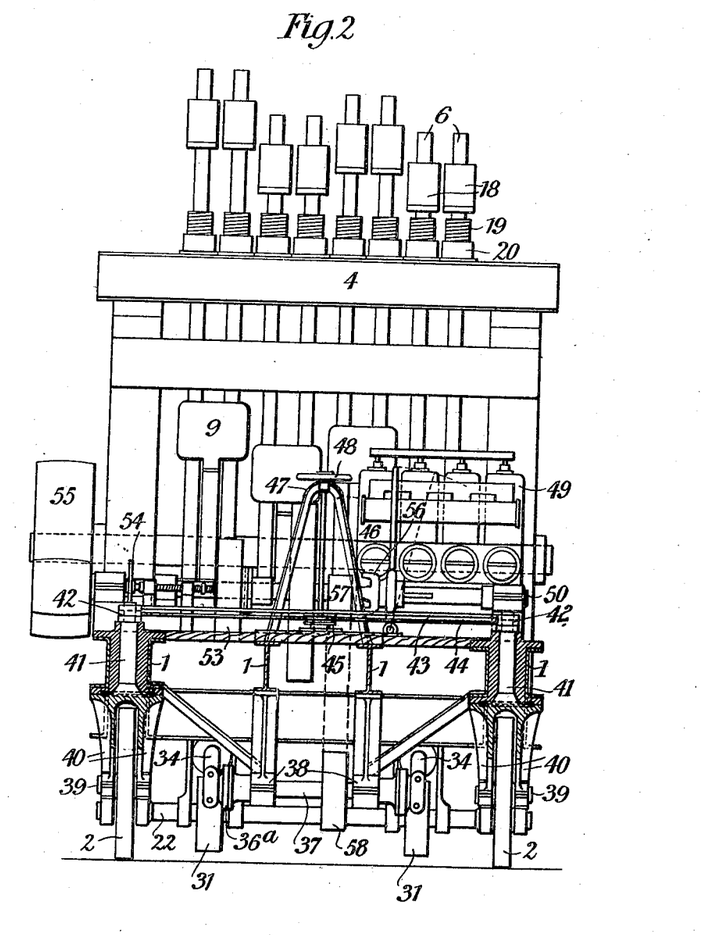
Figure 2 is a front view thereof.
Figure 4:
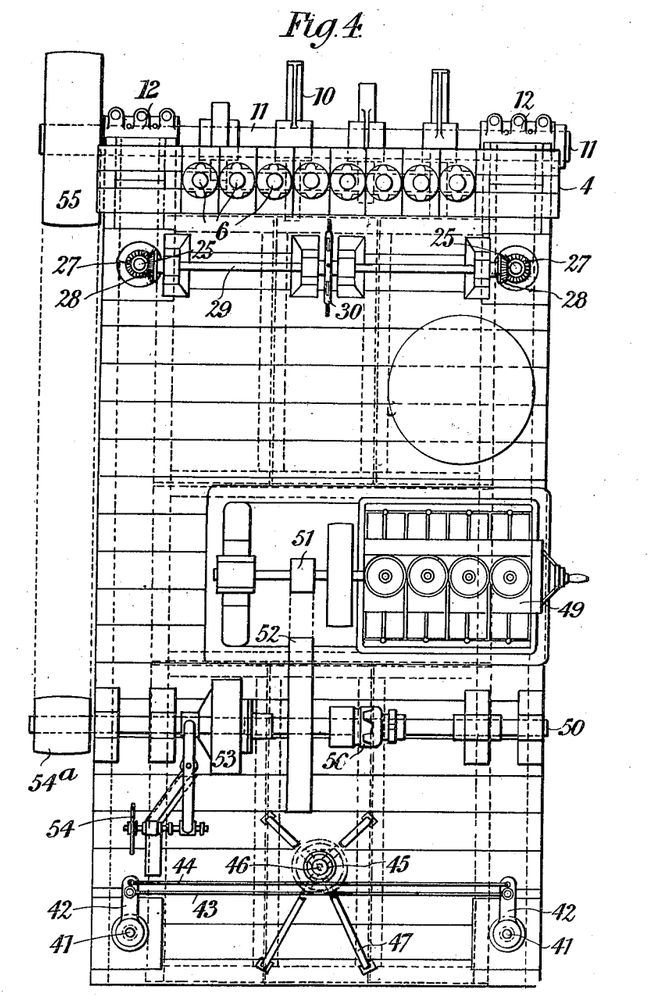
Figure 4 is a plan view.

49 indicates the motor which, in the construction illustrated in Figures 2, 3 and 4, is mounted centrally on the main frame 1. This motor drives a counter-shaft 50 and from this counter-shaft the tools are actuated and the machine is caused to travel. For these purposes the engine shaft is furnished with a chain-wheel or pulley 51 which drives a chain-wheel or pulley 52 on the counter-shaft. The said counter-shaft is also furnished with a friction or other clutch 53 having actuating gear 54 and which is designed to throw into and out of operation the pulley 54ª, which drives by means of a belt the pulley 55 on the cam shaft 11. The counter-shaft 50 is also furnished with a clutch 56 by means of which a pulley 57, carried by the said shaft, can be put into or out of gear, this pulley 57 actuating, by means of a belt or belts the pulley 58 upon the shaft 37 which actuates the eccentric driving mechanism.

Figure 16:
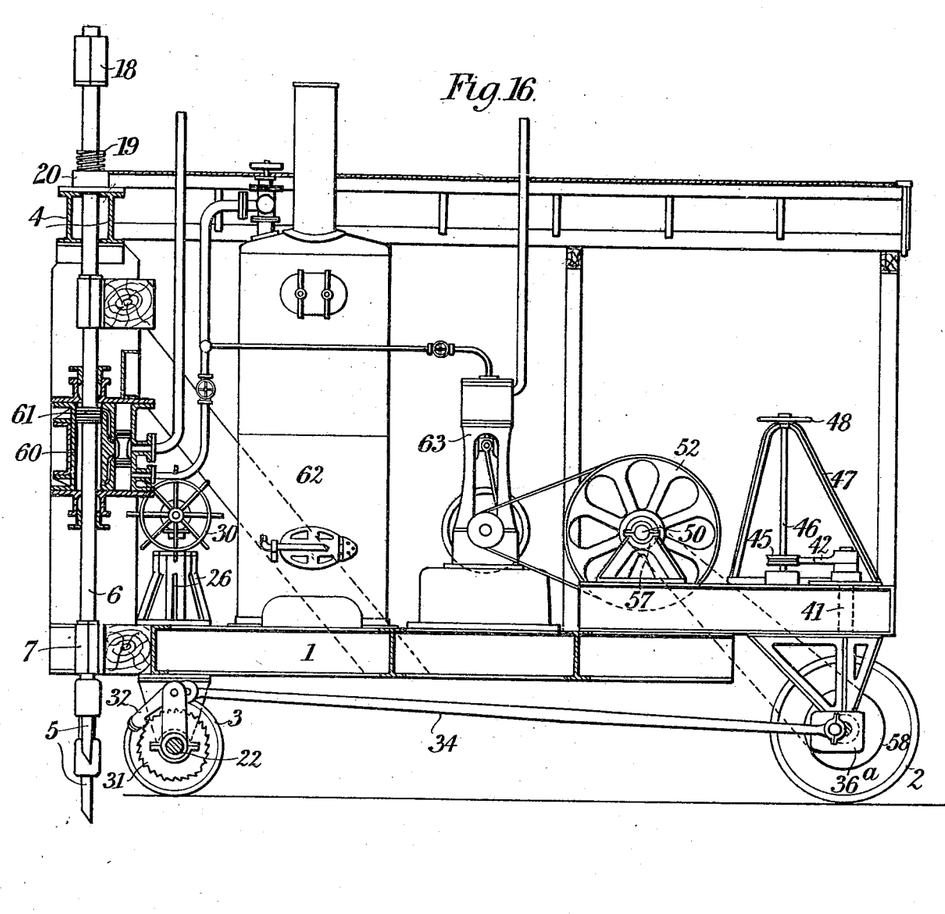
Figure 16 is a sectional side view illustrating a modified construction of the machine.

In Figure 16 a modified construction of machine is illustrated. The chief difference between this construction and that above described consists in the method of actuating the tool stems. In the said modification this is effected by fluid pressure engines, one of which is indicated in section at 60 in the figure. The cylinders of the said engine 60 are arranged around the tool stems which are furnished with pistons 61 designed to reciprocate the said stems. In the form shown the engines are steam driven and steam is supplied to them from a boiler 62 carried by the main frame 1 of the machine. This boiler also supplies steam to the engine 63 for causing the machine to travel.

What I claim and desire to secure by Letters Patent is:—

1. In a machine of the kind described, the combination with a tool supporting frame, vertically movable tool carrying stems located adjacent to one end of said frame, and means for operating said stems; of supporting wheels for said frame, certain of said wheels nearest the tool carrying stems being supplied with bearings having screw threaded extensions, adjusting screws carried by said frame for engaging said threaded extensions, and means for simultaneously rotating said screws to tilt the frame and positively adjust the angular relation of the tool carrying stems with the surface operated upon.

2. In a machine of the kind described, the combination with the vertically movable tool carrying stems, of tappets, each of said tappets being formed in halves and engaging a pair of said stems, and friction rollers carried by said tappets, cams for engaging said rollers to actuate said stems and tools, and means for detachably securing the tappets upon said stems, whereby said tappets may be reversed for the purpose of changing the surfaces of the rollers subject to an impact of the cams.

3. In a machine of the kind described, the combination with a plurality of tool carrying stems, of circular form in cross section, a tappet secured to each pair of said stems and formed in halves, detachably connected together, said tappets being provided with means for locking said stems from rotation in respect to the tappets, friction rollers carried by both halves of said tappets and positioned to engage the actuating cams therefor, vertically movable elevating devices movable laterally into and out of operative relation with said tappets for elevating the tappets and the stems connected therewith out of operative relation with said cams, and lugs carried by said tappets on their front and rear faces for engaging said elevating devices, whereby said stems and the tools carried thereby are prevented from rotation, and whereby the tappets can be reversed with respect to the stems with which they are connected.

ERNEST BARTON HACK.